United States Patent [19]

Freeman et al.

[11] Patent Number: 4,525,751
[45] Date of Patent: Jun. 25, 1985

[54] DISC RECORD WITH TAPERED GROOVE

[75] Inventors: Edward J. Freeman; John E. Economou; John G. Pecorari; Gunter John; Jerome B. Halter; Jack E. James; Richard M. Castle, all of Indianapolis, Ind.; Richard C. Palmer, Blawenburg, N.J.

[73] Assignee: RCA Corporation, Princeton, N.J.

[21] Appl. No.: 412,185

[22] Filed: Aug. 27, 1982

[51] Int. Cl.³ .......................... H04N 5/92; G11B 3/00
[52] U.S. Cl. ....................................... 358/342; 369/133
[58] Field of Search ...................... 358/342, 343, 340; 369/61, 62, 133, 134, 126, 132

[56] References Cited

U.S. PATENT DOCUMENTS

| | | |
|---|---|---|
| 3,906,152 | 9/1975 | Hoogendijk . |
| 3,934,263 | 1/1976 | Palmer . |
| 3,944,754 | 3/1976 | Ishigaki ............................... 369/133 |
| 4,165,495 | 8/1979 | Takahashi ........................... 330/283 |
| 4,170,022 | 10/1979 | Kretschmer et al. ................ 369/133 |
| 4,272,786 | 6/1981 | Gibson . |
| 4,312,013 | 1/1982 | Lang et al. . |
| 4,329,712 | 5/1982 | Lang . |

Primary Examiner—Donald McElheny, Jr.
Attorney, Agent, or Firm—E. M. Whitacre; P. J. Rasmussen; R. G. Coalter

[57] ABSTRACT

A video disc record of the constant angular velocity type (CAV) includes a spiral groove of constant pitch formed in a band on a surface thereof. The groove has a substantially constant nominal vertical dimension and vertical displacements which taper monotonically from an outer radius of the band to an inner radius. One component of the vertical displacement of the groove conveys an FM carrier wave of constant amplitude and relatively high frequency representative of picture information. A second component of the vertical displacement conveys one or more lower frequency FM carrier waves representative of sound information. The amplitude of the second component varies monotonically as a function of the groove radius within the record band to provide a disc having an improved audio FM carrier-to-noise ratio with no substantial perceptible increase in undesirable sound beat effects in images displayed when the disc is played. A mastering system exemplary of the method of forming the grooved disc includes variable gain units in an audio FM carrier wave processing path of the system.

40 Claims, 11 Drawing Figures

Fig. 1b OUTSIDE RADIUS
PRIOR ART

Fig. 1c INSIDE RADIUS
PRIOR ART

*Fig. 2b* OUTSIDE RADIUS

*Fig. 2c* INSIDE RADIUS, 40Å TAPER

DISC RECORD WITH TAPERED GROOVE

The invention relates to records and particularly to video disc records of the type having grooves for information storage.

Disc shaped records of the type in which information is recorded in the form of topological variations imposed upon a spiral groove on a surface thereof are well known. In certain video disc records of this form, the disc (or at least a layer of the disc proximate its surface) is conductive. See, generally, U.S. Pat. No. 3,842,194 of J. K. Clemens. In a player for such records, the signals are recovered from the disc by means of a pick-up stylus comprising a conductive electrode adhered to a face of a dielectric support element (e.g., a diamond shaped to be guided by the groove). With the stylus engaged in the groove, a capacitance is formed between the conductive disc and the electrode. When relative motion occurs between the disc and the electrode, variations in the disc-electrode capacitance are produced which are representative of the topology of the groove. The capacitance variations are detected to produce an electrical manifestation of the recorded information.

Typically, the signal recorded on the disc comprises the sum of a relatively high frequency picture carrier wave that is frequency modulated by a baseband video signal over a relatively wide deviation range (e.g., 4.3 to 6.3 MHz) and one or more lower frequency sound carrier waves frequency modulated by audio signals. Illustratively, for records intended for playback through NTSC standard TV receivers, the sound FM carrier frequencies (for stereo) are about 716 KHz and 905 KHz with deviations of about 50 KHz. The sound carrier is typically recorded at an amplitude which is a small fraction (e.g., one tenth) of the amplitude of the picture FM carrier.

It has been observed that on recovery of signals recorded in the aforementioned format, that a distortion occurs which is manifested as intermodulation products of the sound and picture FM carriers which ultimately results in disturbing visual "beat" patterns in the reproduced image displayed on a television receiver. It is believed that one of the major causes of the intermodulation distortion is related to the asymmetrical structure of the pick-up stylus. Specifically, the dielectric constant of the support element (diamond) on one side of the conductive electrode is much higher than that of the air on the other side of the electrode. As a result, the angle of the effective electric field between the electrode and the disc is not vertical but rather is skewed in the direction of the support element. As the disc is played, the support element tends to follow peaks of the lower frequency FM sound carrier waves so the effective cross section of the disc which the stylus electrode senses or "sees" tends to vary. This variation in the pick-up electrode "aperture" tends to modulate the recovered higher frequency video FM carrier, producing sound beats in the displayed TV image. In addition to this aperture effect, non-linearities in the mastering and replication process of producing video disc records are further sources of possible sound beat interference.

Since the sound beat problem is largely a function of the amplitude of the sound FM carrier in such systems, it would appear that reduction of the sound carrier amplitude recorded on the disc might be effective in reducing sound beats. The difficulty with such an approach to solving the sound beat problem is that any reduction of the sound carrier amplitude also decreases the sound carrier-to-noise (C/N) ratio and this degrades the signal-to-noise (S/N) ratio of the ultimately demodulated baseband audio signal (or signals, for stereo) when the disc is played back on a video disc player.

Heretofore, the amplitude of the recorded sound carrier (irrespective of the amplitude of the baseband sound signal itself) has been maintained at a constant level sufficient to provide a minimum acceptable demodulated audio S/N ratio, and the sound beat problem has been approached in various ways. For example, U.S. Pat. Nos. 4,312,013 of Lang et al., 4,272,786 of Gibson and 4,329,712 of Lang disclose non-linear aperture correction (NLAC) circuits for use in video disc players which effect a reduction of sound beats in the recovered video signals. In U.S. Pat. No. 3,934,263 of Palmer, a reduction of sound beat interference is effected by a deliberate introduction of a selected amount of phase modulation of the picture information by the sound information in the course of mastering video disc records. Such records, however, may not be entirely compatible with other forms of playback transducers (e.g., pressure, optical, etc.).

In addition to the problem of sound beats, video disc records of the capacitance information storage type also suffer problems with occasional groove defects which cause disturbances of the recovered sound carriers which may be manifested as audible ticks and pops when the record is played. Severe defects, detected during production of video disc records, can result in a costly reduction of yield of a production run.

Heretofore, sound carrier defects (or, more correctly, the audibility of such defects) have been reduced to a certain extent by circuit arrangements in video disc players which detect disturbances of the sound carrier and activate defect suppression circuits when a parameter (e.g., amplitude, phase, etc.) of the recovered FM carrier exceeds prescribed normal limits. See, generally, U.S. Pat. Nos. 4,119,812 of Fox and 4,221,930 of Okuno.

The present invention resides in part in the recognition that problems such as the foregoing (e.g., sound beat, disc yield, ticks and pops, etc.) may be substantially alleviated by systematically modifying a particular physical dimension of the video disc record itself.

Furthermore, as will be explained, these benefits may be realized in a disc record that is completely compatible with existing video disc players having capacitance sensing transducers with non-linear apertures and with players having other forms of transducers (e.g., optical, pressure, etc.) regardless of whether or not the transducer aperture is linear or non-linear.

Additionally, the principles of the invention are not dependent upon the nature of the program material (audio or video) which may be recorded on the disc. This "program independent" feature of the invention, as will be explained, is distinctly different from the program level dependent variable-pitch variable-depth cutting technique commonly used to prevent over-cutting and groove wall break-through in mastering conventional phonograph records. Mastering of records embodying the invention is thus greatly simplified in that no "preview" signal source or knowledge of program dynamics is required to gain the benefits of the invention.

A disc record embodying the invention comprises a spiral groove formed in a portion of at least one surface of the disc. The groove has a constant pitch and a nominal vertical dimension which is substantially constant over at least a portion of the disc surface defining a band having an inner radius and an outer radius. The groove has vertical displacements which taper from a maximum dimension at the outer radius to a minimum dimension at the inner radius.

In accordance with a further aspect of the invention, the vertical displacement of the spiral groove at any point between the radii comprises the sum of a first substantially invariant vertical component and a second variable vertical component. The dimension of the second component decreases monotonically from the outer radius to the inner radius.

A method embodying the invention of forming a disc record comprises the steps of providing respective sound and picture signals, each modulated on a respective FM carrier wave and combining the FM carrier waves to provide a composite mastering signal. A spiral groove of constant pitch is formed in a master substrate in accordance with the composite mastering signal. During the forming step, the amplitude of the sound carrier wave is monotonically varied without varying the amplitude of the picture carrier wave.

Figure 1A:
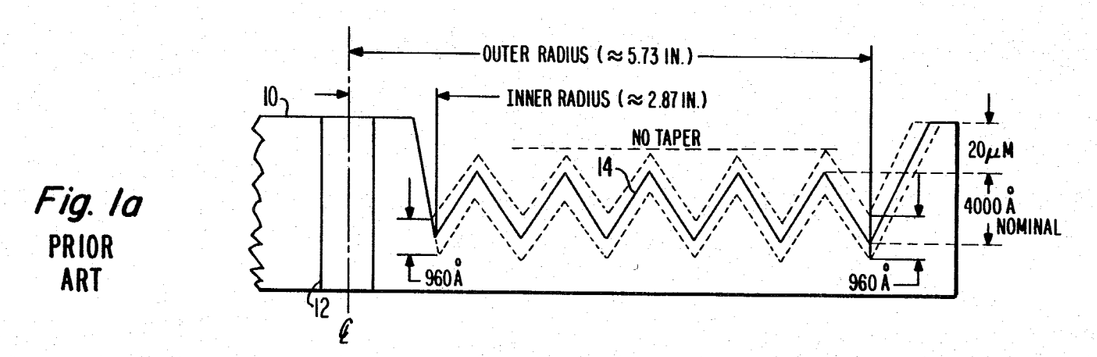
FIGS. 1A, 1B and 1C are partial sectional views (not to scale) of a known form of a video disc record.
Figure 1B:
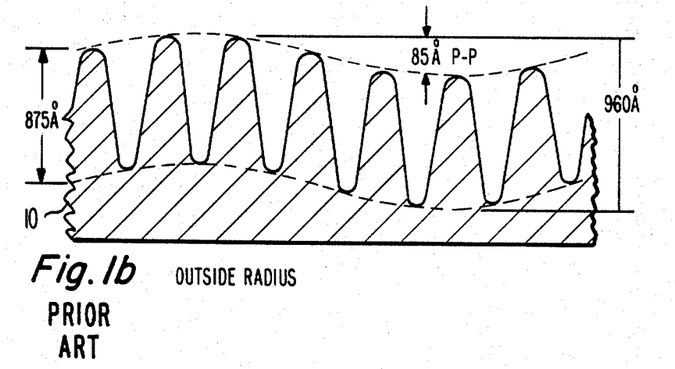
Figure 1C:
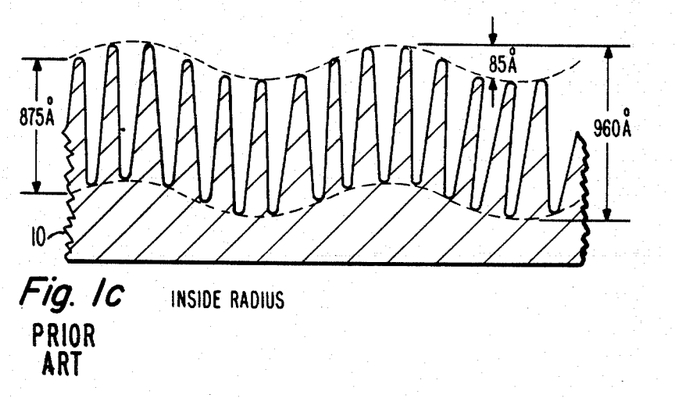

It is helpful to an understanding of the present invention to first consider certain aspects of the topology of a conventional grooved video disc record as exemplified by FIGS. 1A–1C. Such records are available commercially, for example, from RCA Corporation. FIG. 1A is a partial cross-sectional view taken along the radius of the disc record 10. The disc material for pressed records comprises a vinyl plastic compound which is carbon loaded to provide electrical conductivity thereby facilitating signal recovery by means of a capacitance sensing transducer. The material for a master recording substrate (from which pressed discs are ultimately replicated after a matrixing process) comprises, illustratively, copper plated on an aluminum base material. Disc compound formulation, processing and molding operations for such records are described, for example, in "Material and Process Development For VideoDisc Replication" by R. J. Ryan in the publication "RCA Review", Vol. 39, No. 1 March 1978, pp. 87–115.

The disc has a center hole 12 for receiving the spindle of a turntable and a spiral groove 14 formed in the upper disc surface (typically, both surfaces are grooved). The groove "density" is very high being on the order of 10,000 convolutions per inch. For clarity of illustration, only six convolutions of the single groove 14 are shown. The record diameter is about 12 inches with the convolutions extending in a single band of constant pitch from an outer radius of 5.73 inches to an inner radius 2.87 inches. For a disc of the given groove density (or, more correctly, convolution density) rotated at a constant angular velocity of 450 RPM, a single recorded band may provide up to one hour of playing time. Within a given record band the groove density or pitch is constant between the starting (outer) radius and the ending (inner) radius. Lead-in and lead-out convolutions of the groove (which may have a coarse pitch) are not shown. Some records may have two or more recorded "bands" on a given side of the record or only a single relatively narrow band covering only a portion of the available disc recording space on one or both sides of the record. A 20 minute record, for example, may have a 10 minute band recorded on each side.

The groove "depth" (i.e., the vertical dimension of the groove measured from the crest to the valley) is, typically, about 4000 Å (Angstroms) as shown and is constant, that is, independent of the radius within a given record band. The groove amplitude or vertical displacement is not constant but varies in a direction normal to the plane of the disc. These variations are a result of using the FM-FM recording technique (previously discussed) in which sound and picture information is conveyed by respective carrier waves of different frequencies. Maximum (peak-to-peak) groove amplitude variations are illustrated by phantom lines parallel to the groove surface and depend on the amplitude of the FM carrier waves and are independent of the program material which may be recorded on the disc. A "silent groove" disc in which there is no audio or video modulation will exhibit groove amplitude variations, as will a disc recorded with video and or audio information, because of the presence of high-frequency and low-frequency carriers. The amplitude variations are typically on the order of 960 Å peak-to-peak as shown. In the known record, the amplitude variations or vertical displacements of the groove are also independent of the radius of the groove convolutions within a given record band.

FIG. 1B is a section of disc 10 taken tangent to a groove convolution at the outer radius (5.73 inches) of the record band and illustrates in more detail the nature of the groove amplitude variations noted above. As shown, the relatively high frequency video FM groove variations are of constant amplitude (typically, 875 Å) and "ride", so to speak, on the much lower frequency audio FM groove variations which also are of constant amplitude (typically, 85 Å). The specific case shown is for a "silent" (unmodulated) groove of a monophonic record in which the unmodulated sound carrier is at a center frequency of about 716 KHz and the unmodulated (black level) video FM carrier is at a frequency of about 5 MHz. Under these conditions, seven cycles of video carrier occur within one cycle of the audio FM carrier resulting in a groove profile of 960 Å as measured from the highest peak to the lowest valley. The groove undulations at the sound carrier rate are a major source of the sound beat problem as previously discussed.

FIG. 1C is a section of disc 10 of the same length as in FIG. 1B but taken at the inner radius (2.87 inches) of the record band and illustrates the increase in signal element density which occurs as the disc is played or recorded. As shown, the vertical dimensions of the groove are the same as in FIG. 1B but the elements are compressed horizontally by a factor of two. This signal element "packing" effect accentuates the sound beat problem at the inner radius of the disc.

In the known disc, the amplitude of the vertical groove displacements attributable to the sound carrier (85 Å) is constant and corresponds to about 10% of the amplitude of the groove displacements attributable to the picture carrier (875 Å) across the entire surface of the record band. It has been found that this form of groove topology provides an adequate audio carrier-to-noise ratio (typically, 23-26 dB) with an acceptably low sound beat visibility under worst case conditions (i.e., playback at the inner radius) for monophonic records intended for playback through a conventional television receiver.

It is recognized herein, however, that a somewhat higher audio C/N ratio (e.g., 27-30 dB) is needed for monophonic or stereophonic records where it is intended to reproduce the audio portion of the recorded signal through a "hi-fi" or stereophonic sound system. The relatively wide bandwidth of such audio systems tends to reveal noise in the audio which, to a certain extent, is otherwise masked by the relatively narrow bandwidth of the audio portions of conventional television receivers.

Figure 2A:
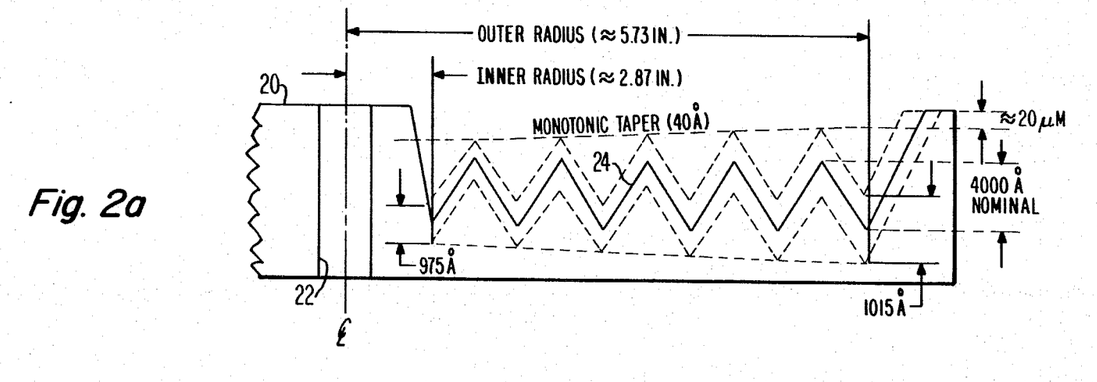
FIGS. 2A, 2B and 2C are partial sectional views (not to scale) of a video disc record embodying the invention.

FIG. 2A is a partial cross section taken along the radius of a disc 20 embodying the invention and illustrates a new groove topology which provides substantially improved audio C/N performance (up to 4 dB in this example) over the greater portion of the record band without incurring a significantly perceptible increase in sound beat visibility. In fact, the greater portion of the audio C/N increase (up to 3 dB) at the outer radius is obtained with substantially no increase in sound beat visibility. This is achieved by monotonically tapering the component of the groove amplitude variations attributable to the sound carrier (carriers for stereo) from a maximum value at the outside radius of the band to a minimum value at the inside radius.

In this specific example of the invention, the taper of the groove 24 is of a substantially constant value (about 14 Å/inch) between the inner and outer radii of the record band. As shown in FIG. 2C (a section of disc 20 tangent to the inner radius), the audio carrier amplitude (100 Å) at the inner radius is 15 Å greater than in the prior art disc (85 Å from FIG. 1B). This provides an increase of about 1 dB of audio C/N for the disc. This increase results in a slight increase in sound beat visibility.

Figure 2B:
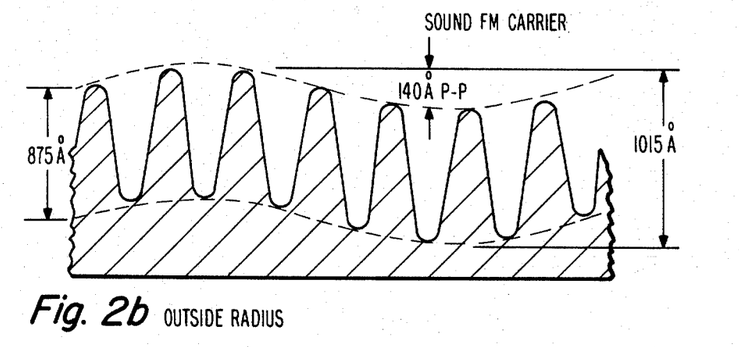
Figure 2C:
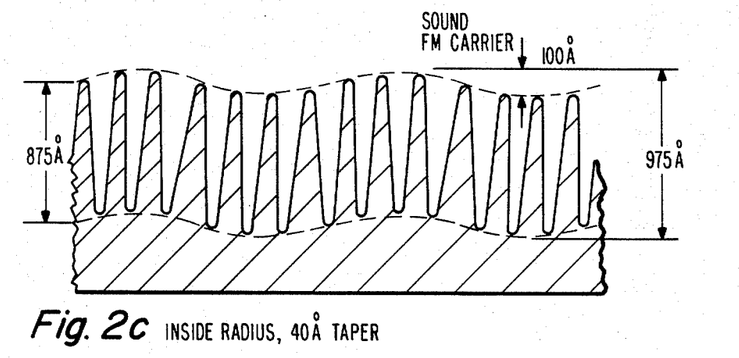

FIG. 2B is a section of disc 20 taken tangent to the groove 24 at the outer radius (5.73 inches) of the record band. As shown, the groove amplitude variations attributable to the audio carrier(s) are 140 Å peak-to-peak rather than 85 Å, a difference of 65 Å. Of this difference, 15 Å is due to the increased audio carrier amplitude which is constant across the record band and 40 Å is due to the linear groove taper. The taper increases the audio C/N ratio by about 3 dB at the outer radius of the disc. This, coupled with the 1 dB increase in the minimum audio carrier amplitude provides a maximum increase of 4 dB at the outer radius as compared with the prior art disc. The increased audio carrier amplitude at the outer radius does not result in increased sound beat visibility because of the reduced signal element packing density but does provide a very substantial increase in the (demodulated) sound signal-to-noise ratio when the record is played back.

Figure 3:
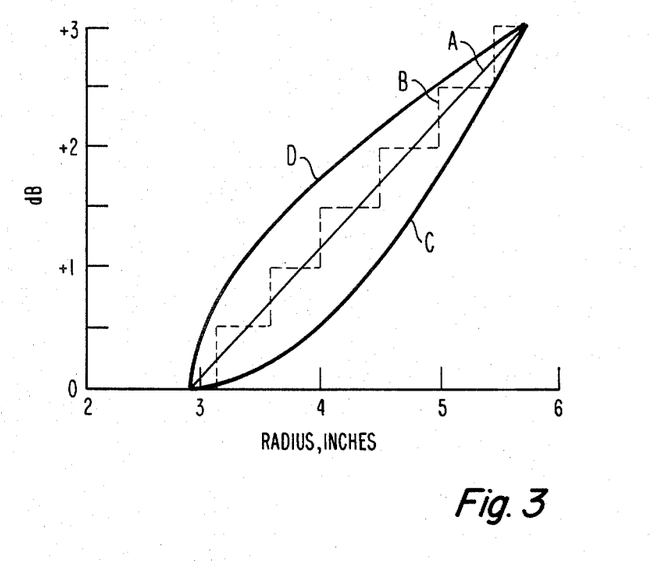
FIG. 3 is a diagram illustrating alternative groove tapers for the disc record of FIGS. 2A, 2B and 2C.

FIG. 3 illustrates other suitable groove amplitude tapers which may be used in forming the disc shown in FIGS. 2A-2C. The horizontal scale represents the groove radius and the vertical scale represents variations (expressed in dB) of the audio FM carrier WAVE component. As shown, each taper is monotonic. Taper A has a slope of 1.04 dB/inch. Since taper A is linear as shown on a logrithmic (dB) scale, the corresponding physical profile of the groove will be slightly concave i.e., upwardly curving from the inner to the outer radius. Taper B is a discrete (stepwise) approximation of taper A. Taper C is convex and thus tends to concentrate the increase in groove amplitude variations towards the outer radius of the disc. Taper D is concave and thus tends to extend the amplitude increase in the direction of the inner radius of the disc. Tapers C and D may be approximated by discrete steps if desired.

Figure 4:
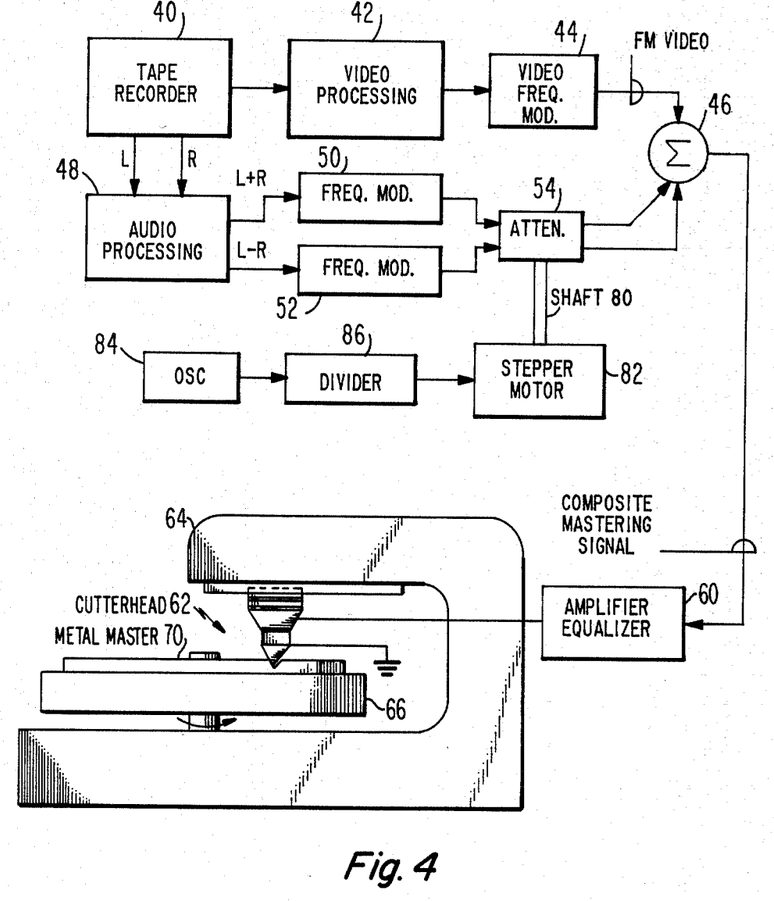
FIGS. 4 and 5 are block diagrams of mastering apparatus for producing the record of FIGS. 2A–2C and embodying the method of the invention.

The mastering system of FIG. 4 is exemplary of the method according to the invention of producing stereophonic (or monophonic) video disc records having tapered grooves. The system includes a video tape recorder 40 which serves as a source for providing a baseband video signal and baseband left channel (L) and right channel (R) stereophonic signals to be recorded. The video signal is applied to a video processing unit 42 which subjects the signal to operations such as, for example, pre-emphasis, buried subcarrier chrominance encoding, bandwidth reduction, etc., and provides a processed video output signal. The video processor is desirably of the type described in the mastering system proposed by M. D. Ross in U.S. Pat. No. 4,277,796, entitled "SLOW DOWN COLOR PROCESSOR FOR VIDEO DISC MASTERING USING SPECIAL MODE VTR" which issued July 7, 1981, and is incorporated herein by reference.

In the Ross system, the video tape recorder operates in a slow motion mode to provide a slowed down (half-rate) audio signal and a redundant field video signal and the processor converts the redundant field video signal to half-rate (30 field/sec.) non-redundant video signal of reduced bandwidth. The advantage of "slowing down" the audio and video signals and reducing the mastering turntable speed proportionally during mastering is that full bandwidth recordings may be made with a disc recording transducer of lesser bandwidth. See also, U.S. Pat. No. 4,044,379 of J. B. Halter entitled, "METHOD AND APPARATUS FOR ELECTROMECHANICAL RECORDING OF SHORT WAVELENGTH MODULATION IN A METAL MASTER" which issued Aug. 23, 1977, and is incorporated herein by reference. It will be appreciated, or course, that in systems where the mastering transducer bandwidth is sufficiently wide, that recorder 40 may be operated at normal speed, slow down processing may be omitted and the record grooves may be formed at "real time" rates.

The processed baseband video signal is applied to a video frequency modulator 44 which provides an FM video output signal of constant amplitude to one input of a summing circuit 46. The baseband audio signal L and R are applied to an audio processing unit 48 which imparts pre-emphasis to the signals and includes a stereo encoding matrix for forming stereo sum (L+R) and difference (L−R) output signals. Processor 48 may also include audio compressor circuits to provide an increase in audio signal-to-noise ratio upon subsequent expansion of the demodulated audio signals when the record is played back in a video disc player.

The stereo sum and difference signals are applied to respective inputs of frequency modulators 50 and 52. Suitable modulator center frequency choices for mastering NTSC standard video disc records are 716 KHz for the L+R signal and 905 KHz for the L−R signal with equal frequency deviations of plus and minus 50 KHz. The frequencies and deviations are reduced by a factor of one-half in half-rate mastering. The choice of 716 KHz for the stereo sum FM signal facilitates playback of stereo discs on existing monophonic players equipped with a single 716 KHz audio FM demodulator.

The constant amplitude deviating-frequency audio FM carrier waves produced by modulators 50 and 52 are coupled via an attenuator 54 to respective inputs of summing unit 46 which combines the three FM carrier waves to provide a composite output signal equal to the sum thereof. The composite mastering signal is applied to the cutterhead 62 of a mastering lathe 64 via an amplifier-equalizer 60 which provides the necessary cutterhead drive power and compensates for non-linearities in the cutterhead frequency and phase response characteristics. Lathe 64 includes a turntable 66 for supporting a metal master recording substrate 70. The substrate comprises, illustratively, an aluminum base material having a copper coated upper surface in which the grooves are ultimately formed. Details of the cutterhead and other suitable recording materials are described in the aforementioned Halter patent.

Attenuator 54 comprises a pair of ganged potentiometers of the constant impedance type (e.g., "L-pads") and are coupled via shaft 80 to a drive motor 82. The drive pulses for motor 82 are provided by an oscillator 84 having an output coupled to motor 82 via a divider 86. The oscillator may be of any suitable frequency with the divider providing the function of electrically reducing the motor speed which may be further reduced, if desired, by means of mechanical gears (not shown).

In operation, turnable 66 is rotated at a constant angular velocity (e.g., about 450 RPM for real-time mastering or about 225 RPM for half-rate mastering of NTSC format discs) and cutter head 62 is lowered so as to engage the cutterhead stylus in the copper coating of the substrate 70. A spiral groove of constant pitch is formed in the copper surface by translating cutterhead 62 at a constant linear velocity in a radial path across the substrate, from an outside radius to an inside radius. Lead-in and lead-out grooves (of coarse pitch) for a record band are formed by increasing the radial velocity of the cutterhead. As the groove is formed, the composite mastering signal is applied to cutterhead 62 which varies the vertical amplitude of the groove in accordance with the sum of the video and two audio FM carrier waves.

A taper is imparted to the groove by initially setting attentuator 54 to provide 0 dB of attenuation. Oscillator 84 is then energized whereupon the low frequency output pulses of divider 86 cause motor 82 to slowly rotate shaft 80 thereby monotonically reducing the amplitude of the two audio FM carrier waves without alteration of the amplitude to the video FM carrier wave. For mastering a substrate at half rate, the recording time is two hours (maximum). The oscillator frequency, divider ratio, motor sensitivity (degrees/pulse), mechanical gear ratio (if used) and the attenuator range are all selected such that 3 dB of attenuation is imparted to the audio FM carrier waves in two hours for half rate recording (one hour for real time mastering). The attenuation rate may be constant (e.g., 0.025 dB/minute) to obtain a groove taper of the form of taper A in FIG. 3 or it may be varied to change the shape of the taper if desired.

Upon completion of the recording process, vinyl records may be pressed from stampers derived from the master substrate by a matrixing process well known in the recording art. Replication of video disc records is described in detail in the previously mentioned Ryan article.

Since the audio cutting amplitude is relatively small and the taper imparted to the groove is very small (only a few Angstroms per inch of audio carrier amplitude reduction), it may be desirable to record a test band on the outer radius of the master substrate prior to making the recording to verify that the cutting amplitude is correct. One may optically measure the amplitude of the groove variations attributable to the audio carrier waves by means of the optical measurement technique disclosed by W. R. Roach and I. Gorog, in U.S. patent application Ser. No. 189,355 filed Sept. 22, 1980, and entitled, "SOUND CARRIER AMPLITUDE MEASUREMENT SYSTEM". The test band is not needed in pressed discs and so may be recorded at a radius on the master substrate greater than the maximum radius of the recorded information band of the vinyl records. During the replication or "matrixing" process, the test band may be removed prior to forming the stamper discs.

Figure 5:
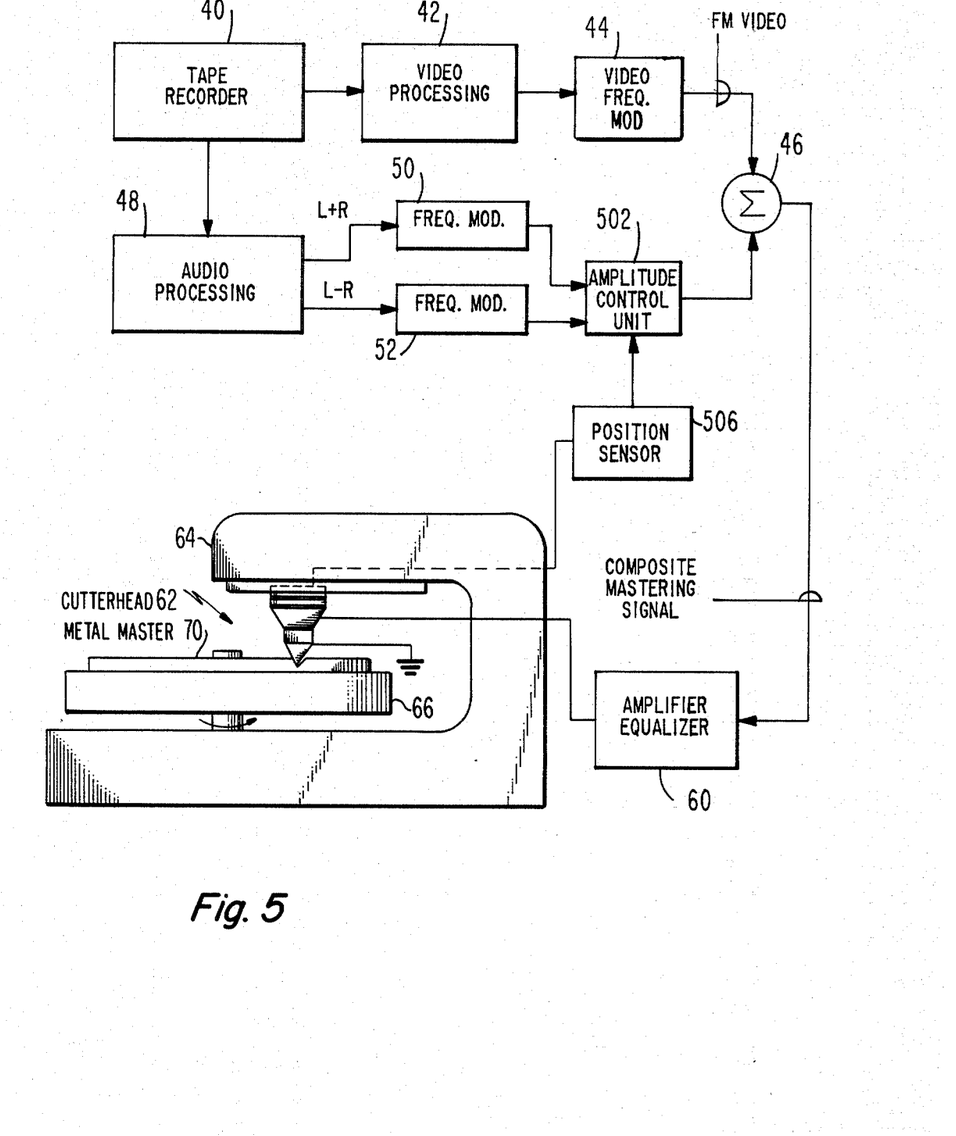

In FIG. 5 the mastering system of FIG. 4 has been modified to provide automatic control of the amplitude of the audio FM recording carrier waves. The modification comprises replacing attenuator 54 (mechanical L-pads) with an electrically controllable amplitude control unit 502. Stepper motor 82, oscillator 84 and divider 86 are eliminated and the function of generating an amplitude control signal for unit 502 is provided by a position sensor 506 coupled to the cutterhead 62 assembly. To minimize possible effects of mechanical drag on the translating member for cutterhead 62, it is desirable that the position sensor be of the optical grating type. Such sensors are commercially available, for example, from Analam Corporation, and provide very high displacement resolution with minimal undesirable mechanical side effects.

Operation of the system of FIG. 5 is similar to that of FIG. 4 except that the amplitude of the audio FM carrier waves is directly controlled in accordance with the position of cutterhead 62 with respect to the master substrate 70. This provides the advantage of relieving the mastering system operator of the task of resetting the attenuator position at the start of each recording session and provides more uniform and reproducable attenuation characteristics.

Sensor 506 provides an electrical signal manifestation (e.g., a binary coded decimal signal) to amplitude control unit 502 representative of the radial cutterhead position which automatically decreases the audio carrier amplitude as the substrate is recorded. Desirably, the signal manifestation produced by sensor 506 is a linear representation of radial position. The taper profile (see FIG. 3) is preferably determined by the transfer characteristics of amplitude control unit 502.

Figure 6:
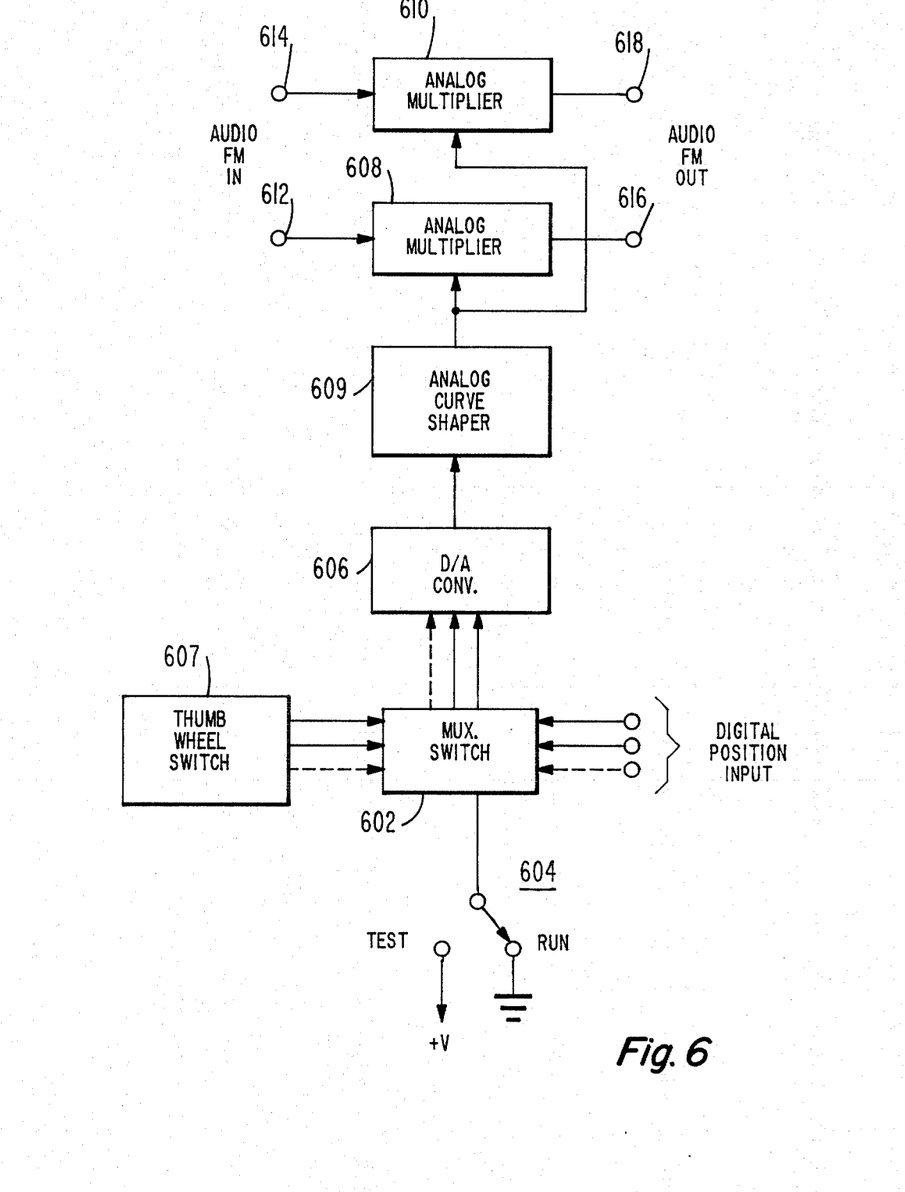
FIGS. 6 and 7 are block diagrams illustrating certain details of the apparatus of FIG. 5.

Amplitude control unit 502 may be implemented as shown in block diagram form in FIG. 6. The BCD output of the digital position sensor 506 is applied to the input terminals (3 shown) of a multiplex (mux) switch 602 controlled by a run/test switch 604. In the run or normal recording position of switch 604, the digital position signals are coupled via switch 602 to the inputs of a digital to analog (D/A) converter 606 which produces an analog output signal representative of the radial position of cutterhead 62. In the test position of switch 604, the inputs of converter 606 are coupled to the output of a BCD thumbwheel switch 607 for simulating a particular radial position signal. This is useful, for example, when cutting the test band on the mastering substrate prior to start of a master recording to verify that the audio FM carrier levels are correct.

The output of D/A converter 606 is applied to the control terminals of a pair of analog multipliers 608 and 610 via an analog curve shaper 609. Multipliers 608 and 610 are linear four quadrant multipliers such as the type 1596 integrated circuit and receive the constant amplitude stereo FM carrier waves at their respective input terminals (612 and 614) and provide variable amplitude stereo FM carrier waves at their respective output terminals (616 and 618). For monophonic recordings, only one multiplier would be used.

Analog curve shaper 609 determines the taper of the groove attributable to the stereo FM carrier wave component of the composite mastering signal and may comprise a diode-resistor matrix having resistor values selected to provide a nonlinear transfer function so as to produce the tapers illustrated in FIG. 3. Where a linear (non-logarithmic) groove taper is desired, the analog curve shaper 609 may be omitted.

Figure 7:
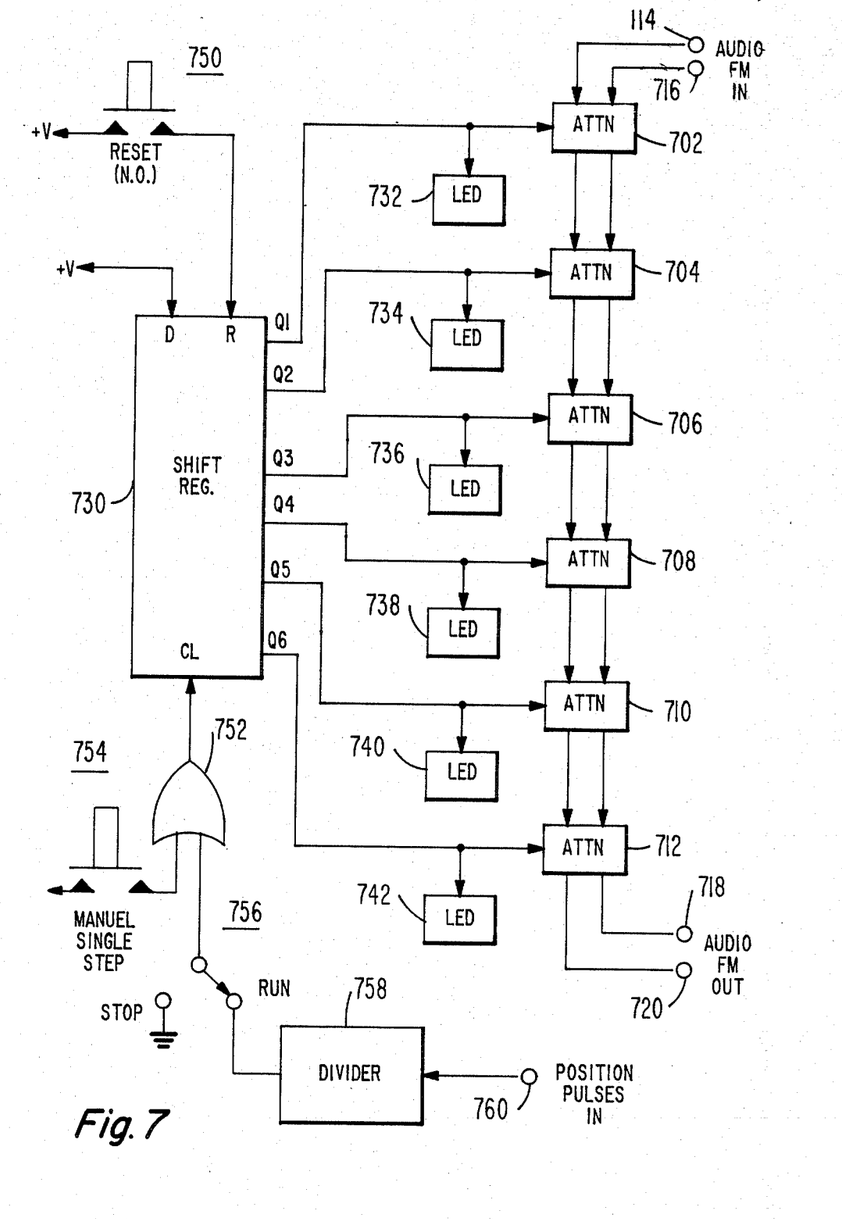

FIG. 7 is a block diagram illustrating another form of amplitude control unit suitable for use in the mastering system of FIG. 5. This arrangement provides a discrete or stepped taper such as taper B of FIG. 3 (six steps of 0.5 dB each). The unit comprises a cascade connection of six stereo dual channel attenuator sections 702-712 each of which provides 0.5 dB of attenuation when enabled and 0 dB of attenuation when disabled. The constant amplitude stereo FM carrier waves are applied to the attenuator chain input terminals 714 and 716 and variable amplitude stereo FM carrier waves are produced at the attenuator chain output terminals 718 and 720. The magnitude of the variation depends upon the number of attenuator sections that are enabled which in turn is controlled by a six bit shift register 730 having outputs Q1-Q6 coupled to respective ones of the attenuators 702-712. The shift register outputs Q1-Q6 are also coupled to respective light emitting diodes (LEDs) 732-742 for providing a visual indication of the number of attenuator sections enabled.

The data (D) input of shift register 730 is connected to a source of positive supply potential +V which is also coupled to the reset input (R) via a reset switch 750 which is of the normally open kind. Clock pulses for the clock input (CL) of shift register 730 are provided by an OR gate 752 having one input connected to the positive supply +V via a normally open switch 754 for manually clocking the shift register and a second input coupled to a mode control switch 756. In the "stop" position of switch 756 the second input of gate 752 is grounded and in the "run" position of the switch the second input of the gate is coupled to the output of a divider 758 which has an input terminal 760 for receiving position pulses from the position sensor 506 of FIG. 5 (the position pulses may be taken from the most significant bit, MSB, of the second decade of the position sensor output).

In operation, the amplitude control unit is set to 0 dB attenuation prior to recording by depressing switch 750 which resets the shift register thereby disabling attenuator sections 702-712 and extinguishing LEDs 732-742. Test attenuation levels may be simulated by depressing the manual single step switch 754 which clocks the logic 1 signal present at the data (D) input of the shift register sequentially into each shift register stage. During mastering the mode control switch 756 is normally placed in the run position whereby the shift register is clocked in response to the frequency divided position pulses produced by the position sensor. As the shift register is clocked, attenuator sections 702-712 are sequentially enabled thereby providing a stair-step form of taper to the groove being recorded (FIG. 3, taper B) and LEDs 732-742 are sequentially illuminated providing an indication of the attenuation level. Advancement of the shift register may be inhibited by placing switch 756 in the stop position.

The number of attenuator sections of the amplitude control unit may be increased if desired to provide a finer step approximation to a desired groove taper. In this specific example, each attenuation section of the cascade connection provides equal attenuation (0.5 dB). This, however, is not necessary and tapers of arbitrary shape may be generated by appropriate choice of the attenuation provided by each individual attenuation section.

In the examples of the mastering system shown and described herein, control of the amplitude of the sound carrier wave is provided by interposing a level control device in the sound FM carrier signal path subsequent to frequency modulation of the carrier but prior to addition of the sound and picture carriers. This approach is preferred because it is accurate and readily adaptable to mastering systems of the general kind proposed by Ross and by Halter. However, it will be appreciated that FM carrier level control may be accomplished in other analogous ways within the spirit and scope of the invention. As an example, the audio frequency modulator (or modulators for stereo) may be directly amplitude modulated by the taper control signal. FM carrier wave amplitude control may be facilitated by means of optically coupled devices or other suitable forms of variable transmission units if desired. Although it is preferred that the groove be formed by means of electro-mechanical cutting, it will be appreciated that the principles of the invention are of general utility in video disc mastering an may be applied to other groove forming techniques e.g., electron beam recording, laser beam recording and so forth.

What is claimed is:

1. A method for producing a video disc record comprising the steps of:
    (a) providing respective sound and picture signals, each modulated on a respective FM carrier wave;
    (b) combining said FM carrier waves to provide a composite mastering signal;
    (c) forming a spiral groove in a master substrate in accordance with said composite mastering signal; and
    (d) varying the amplitude of said sound FM carrier wave without varying the amplitude of said picture FM carrier wave while forming said groove in said substrate.

2. The method recited in claim 1 wherein the amplitude of the FM carrier wave is varied monotonically.

3. The method recited in claim 1 wherein the step of varying the amplitude of the sound FM carrier wave is performed prior to the step of combining said FM carrier waves.

4. The method recited in claim 2 wherein the step of monotonically varying the amplitude of the sound FM carrier wave comprises:
    providing a control signal manifestation which varies as a function of time; and applying said control signal manifestation to a variable transmission device interposed in a path for conducting said sound FM carrier wave.

5. The method recited in claim 2 wherein the step of monotonically varying the amplitude of the sound FM carrier wave is performed in discrete steps at predetermined intervals from a given starting time.

6. The method recited in claim 2 wherein the step of monotonically varying the amplitude of the sound FM carrier wave is performed at a continuous rate beginning at a predetermined starting time.

7. The method recited in claim 2 wherein the step of monotonically varying the amplitude of the sound FM carrier wave is performed in discrete steps corresponding to predetermined radial groove locations.

8. The method recited in claim 2 wherein the step of monotonically varying the amplitude of the sound FM carrier wave is performed as a substantially continuous function of the radius of said spiral groove.

9. The method recited in claim 1 further comprising the steps of:
sensing the radius of said spiral groove during said forming step; and
altering the amplitude of said sound FM carrier wave in accordance with the sensed radius.

10. The method recited in claim 1 further comprising the steps of:
sensing the radius of said spiral groove during said forming step; and
altering the amplitude of said spiral groove in discrete steps in accordance with the sensed radius.

11. The method as recited in claim 1 further comprising the steps of:
sensing the radius of said spiral groove during said forming step; and
altering the amplitude of said spiral groove continuously in accordance with the sensed radius prior to said forming step.

12. The method as recited in claim 2 wherein the step of monotonically varying the amplitude of said FM carrier wave includes reducing the amplitude of said FM carrier from a given value at an outer radius of a band of said disc record to a lesser value at an inner radius of said band to cause said groove to exhibit a predetermined taper.

13. The method as recited in claim 12 wherein the rate of variation of said amplitude of said FM carrier wave is controlled such that said predetermined taper is a linear function of the radius of said groove within said band.

14. The method as recited in claim 12 wherein the rate of variation of said amplitude of said FM carrier wave is controlled such that said predetermined taper is a non-linear function of the radius of said groove within said band.

15. The method as recited in claim 12 wherein the rate of variation of said amplitude of said sound FM carrier wave is controlled such that said predetermined taper is substantially equal to 1 dB/inch over at least a portion of the grooved surface of said disc.

16. The method as recited in claim 1 further comprising the step of initially adjusting the amplitude of said sound FM carrier wave to a predetermined level such that amplitude variations of said groove at an outer radius of said record and attributable to said sound FM carrier wave are substantially equal to 140 Angstroms peak-to-peak.

17. A video disc record for playback at a substantially constant angular velocity, said record comprising:
a disc having a spiral groove formed in at least one surface thereof, said groove having a substantially constant pitch between an outer radius thereof and an inner radius, thereof, said groove having a substantially constant nominal depth and peak-to-peak vertical variations monotonically tapered from a maximum value at said outer radius to a minimum value at said inner radius.

18. A video disc record as recited in claim 17 wherein said vertical variations comprise a substantially constant picture FM carrier wave component and a variable sound FM carrier wave component.

19. A video disc record as recited in claim 18 wherein said sound FM carrier wave component exhibits an amplitude variation of substantially 1 dB per inch.

20. A video disc record as recited in claim 18 wherein the vertical variations attributable to said sound FM carrier wave component at the outer radius of said record are substantially equal to 140 Angstroms peak-to-peak.

21. A video disc record as recited in claim 18 wherein the vertical variations attributable to said sound FM carrier wave component exhibit a minimum value of substantially 100 Angstroms at the innermost radius of said record.

22. A video disc record as recited in claim 17 wherein the taper of said groove variations exhibits discrete steps.

23. A video disc record as recited in claim 17 wherein the taper of said groove variations is substantially linear.

24. A video disc record as recited in claim 17 wherein the taper of said groove variations is convex.

25. A video disc record as recited in claim 17 wherein the taper of said groove variations is concave.

26. A disc record, comprising: a base material having a spiral groove formed in at least one surface thereof, said groove having a constant pitch and a nominal vertical dimension which is substantially constant over at least a portion of the disc surface defining a band having an inner radius and an outer radius, said groove having vertical displacements within said band which taper monotonically from a maximum dimension at said outer radius to a minimum dimension at said inner radius.

27. A disc record as recited in claim 26 wherein the vertical displacement of said spiral groove at any point between said radii comprises the sum of a first substantially invariant vertical component and a second variable vertical component, the dimension of said second component decreasing monotonically from said outer radius to said inner radius of said band.

28. A disc record as recited in claim 27 wherein said second vertical component is representative of an FM carrier wave.

29. A disc record as recited in claim 28 wherein said FM carrier wave exhibits amplitude variations on the order of about 1 dB per inch within said band.

30. A disc record as recited in claim 26 wherein the taper of said groove displacements exhibits discrete steps.

31. A disc record as recited in claim 26 wherein the taper of said groove displacements is substantially linear.

32. A disc record as recited in claim 26 wherein the taper of said groove displacements is convex.

33. A disc record as recited in claim 26 wherein the taper of said groove displacements is concave.

34. A disc record as recited in claim 27 wherein said second component exhibits a taper of about 14 Angstroms per inch.

35. A disc record as recited in claim 27 wherein said second component has a maximum value on the order of about 140 Angstroms.

36. A disc record as recited in claim 27 wherein said second component has a minimum value on the order of about 100 Angstroms.

37. A disc record as recited in claim 27 wherein said second component is representative of the sum of two FM carrier waves and wherein the first component is representative of a third FM carrier wave.

38. A disc record as recited in claim 37 wherein said two FM carrier waves are modulated so as to convey audio information and wherein said third FM carrier wave is modulated so as to convey video information.

39. A method for recording a disc record, comprising:
- providing a low frequency AC signal and a high frequency AC signal, each of constant amplitude;
- combining said AC signals to provide a composite signal;
- forming a spiral groove in a master substrate in accordance with said composite signal; and
- monotonically varying the amplitude of said low frequency AC signal without altering the amplitude of said high frequency AC signal while forming said groove in said substrate material.

40. The method as recited in claim 39 further comprising the step of forming a replica of the groove pattern of the master substrate.

* * * * *